US006996819B1

(12) United States Patent
Alanis

(10) Patent No.: US 6,996,819 B1
(45) Date of Patent: Feb. 7, 2006

(54) METHOD FOR EFFICIENTLY DOWNLOADING SCSI AND SERVO FIRMWARE TO SCSI TARGET CONTROLLERS

(75) Inventor: Belisario Davila Alanis, Lake Forest, CA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/394,023

(22) Filed: Sep. 10, 1999

(51) Int. Cl.
*G06F 9/44* (2006.01)

(52) U.S. Cl. .................................................. 717/173
(58) Field of Classification Search ............... 710/46; 360/77.02; 365/230.05; 717/170, 169, 173, 717/171, 172, 168, 174–178; 713/2
See application file for complete search history.

(56) References Cited

U.S. PATENT DOCUMENTS

| H0696 H | * | 10/1989 | Davidson ..................... 370/433 |
| 5,255,136 A | * | 10/1993 | Machado et al. ......... 360/77.02 |
| 5,450,589 A | * | 9/1995 | Maebayashi et al. .......... 713/2 |
| 5,481,713 A | * | 1/1996 | Wetmore et al. ............ 717/170 |
| 5,586,304 A | * | 12/1996 | Stupek et al. ............... 707/201 |
| 5,590,356 A | * | 12/1996 | Gilbert ........................ 712/31 |
| 5,701,492 A | * | 12/1997 | Wadsworth et al. ........ 711/103 |
| 5,809,287 A | * | 9/1998 | Stupek et al. ................. 703/22 |
| 5,878,256 A | * | 3/1999 | Bealkowski et al. ........ 711/103 |
| 5,883,852 A | * | 3/1999 | Ghia et al. ............. 365/189.02 |
| 5,930,358 A | * | 7/1999 | Rao ............................ 713/193 |
| 5,930,504 A | * | 7/1999 | Gabel ............................ 713/2 |
| 6,356,906 B1 | * | 3/2002 | Lippert et al. ................ 707/10 |
| 6,523,125 B1 | * | 2/2003 | Kohno et al. ............... 713/320 |

OTHER PUBLICATIONS

SCSI-2 Specificaton (Draft X3T9.2 Rev 10L), X3.131-1994, American National Standards Institute (ANSI).*
IBM Technical Disclosure Bulletin, Oct. 1994 (US), vol. 37, issue 10, p. 181-186.*
"Microsoft Press Computer Dictionary, 3rd Ed.", Microsoft Press, Sep. 19, 1997, "World Wide Web".*
"Microsoft Press Computer Dictionary, 3rd Ed.", Microsoft Press, Sep. 19, 1997, "Internet".*
Stroustrup, Bjarne, "C++ Programming Language, 3rd Ed.", Addison-Wesley, 1997, Appendix C.7.*
"FreeBSD System Calls Manual—recv" and "FreeBSD System Calls Manual—read", FreeBSD Foundation, http://www.freebsd.org/cgi/man.cgi.*
Lindquist, Tim, "2.c.5 Sockets Context and History", Arizona State University, http://pooh.east.asu.edu/Cet556/ClassNotes/Serial/cnSerialThreadSocket-17.html#pgfId-176687.*
Hafey, Chris, "BSD Sockets", www.ecst.csuchico.edu/~chafey/prog/sockets/sinfo1.html.*
"Microsoft Computer Dictionary", 2002, Microsoft Press, 5th ed., p. 574.*

* cited by examiner

*Primary Examiner*—Todd Ingberg
*Assistant Examiner*—Eric B. Kiss
(74) *Attorney, Agent, or Firm*—Alfred W. Kozak; Mark T. Starr; Lise A. Rode

(57) ABSTRACT

A system and method for overcoming prior impediments to the downloading of microcode firmware to a target controller of a disk or tape storage unit where an Inquiry command determines the type of firmware required by the target controller while a selection means chooses an appropriately sized buffer array for temporarily storing the firmware. Additionally, a checkout is instituted to make sure the selected firmware is not merely another duplication of the existing resident firmware thus to prevent the unnecessary download of an already existing firmware version.

5 Claims, 13 Drawing Sheets

TYPICAL TWELVE-BYTE CDB
(TABLE 23)

| | BIT 7 | BIT 6 | BIT 5 | BIT 4 | BIT 3 | BIT 2 | BIT 1 | BIT 0 |
|---|---|---|---|---|---|---|---|---|
| BYTE 0 | OPERATION CODE | | | | | | | |
| BYTE 1 | LOGICAL UNIT NUMBER | | | RESERVED | | | | |
| BYTE 2 | (MSB) | | | | | | | |
| BYTE 3 | LBA = LOGICAL BLOCK ADDRESS (IF REQUIRED) | | | | | | | |
| BYTE 4 | | | | | | | | |
| BYTE 5 | | | | | | | | (LSB) |
| BYTE 6 | (MSB) | | | | | | | |
| BYTE 7 | TRANSFER LENGTH (IF REQUIRED) | | | | | | | |
| BYTE 8 | PARAMETER LIST LENGTH (IF REQUIRED) | | | | | | | |
| BYTE 9 | ALLOCATION LENGTH (IF REQUIRED) | | | | | | | (LSB) |
| BYTE 10 | RESERVED | | | | | | | |
| BYTE 11 | CONTROL BYTE | | | | | | | |

*Figure 2*
*(Prior Art)*

WRITE BUFFER COMMAND

| BIT<br>BYTE | 7 | 6 | 5 | 4 | 3 | 2 | 1 | 0 |
|---|---|---|---|---|---|---|---|---|
| 0 | OPERATION CODE (3Bh) ||||||||
| 1 | RESERVED || ||| MODE |||
| 2 | BUFFER ID ||||||||
| 3 | (MSB) BUFFER OFFSET |||||||  |
| 4 |  ||||||||
| 5 |  |||||||(LSB) |
| 6 | (MSB) PARAMETER LIST LENGTH |||||||  |
| 7 |  ||||||||
| 8 |  |||||||(LSB) |
| 9 | CONTROL ||||||||

*Figure 3*
*(Prior Art)*

WRITE BUFFER MODE FIELD

| MODE | DESCRIPTION | IMPLEMENTATION REQUIREMENTS |
|---|---|---|
| 000b | WRITE COMBINED HEADER AND DATA | OPTIONAL |
| 001b | VENDOR-SPECIFIC | VENDOR-SPECIFIC |
| 010b | WRITE DATA | OPTIONAL |
| 011b | RESERVED | RESERVED |
| 100b | DOWNLOAD MICROCODE | OPTIONAL |
| 101b | DOWNLOAD MICROCODE AND SAVE | OPTIONAL |
| 110b | DOWNLOAD MICROCODE WITH OFFSETS | OPTIONAL |
| 111b | DOWNLOAD MICROCODE WITH OFFSETS AND SAVE | OPTIONAL |

*Figure 4*
*(Prior Art)*

OPERATION CODE

| BITS | 7 | 6 | 5 | 4 | 3 | 2 | 1 | 0 |
|---|---|---|---|---|---|---|---|---|
| BYTE 0 | GROUP CODE | | | COMMAND CODE | | | | |

GROUP CODE FIELD

| GROUP | BIT 7 | BIT 6 | BIT 5 | NUMBER OF COMMAND BYTES |
|---|---|---|---|---|
| 0 | 0 | 0 | 0 | SIX |
| 1 | 0 | 0 | 1 | TEN |
| 2 | 0 | 1 | 0 | TEN (NEW IN SCSI-2) |
| 3 | 0 | 1 | 1 | RESERVED |
| 4 | 1 | 0 | 0 | RESERVED |
| 5 | 1 | 0 | 1 | TWELVE |
| 6 | 1 | 1 | 0 | VENDOR SPECIFIC |
| 7 | 1 | 1 | 1 | VENDOR SPECIFIC |

*Figure 5*
*(Prior Art)*

METHOD FOR EFFICIENTLY DOWNLOADING SCSI AND SERVO FIRMWARE TO SCSI TARGET CONTROLLERS

FIELD OF THE INVENTION

This disclosure involves enhancements in the process of loading microcode from a system to a target controller for a disk or tape drive.

BACKGROUND OF THE INVENTION

Many of the modern computer system networks utilize and require that specialized firmware be downloaded for placement on a target medium such as a disk or tape drive.

FIGS. 1A and 1B are illustrative of arrangements for downloading firmware in a SCSI (Small Computer Systems Interface) environment. Many inherent problems occurred in such downloading operations, such as properly identifying the target device and properly selecting the appropriate firmware to be downloaded. Then also, a latency problem occurred when the buffer arrays were not of sufficient size to handle the large volume of firmware bytes required for the download thus requiring sequences of multiple download commands to accomplish the download. It should here be understood that the target for download of firmware is the Controller (Peripheral Controller) which holds the microcode which is used to handle and control a peripheral device such as a disk, a set of disks, or tape unit.

A basic function of computer systems and digital modules very often is involved with loading microcode into various digital devices to make them properly operative. In many earlier systems SCSI firmware could only be downloaded using a single download command together with a single dimensional buffer array. On many occasions, the downloading utility program was faced with a situation where the system array capacity was not sufficiently large enough to accommodate the firmware that was required to be downloaded.

As a result, the downloading was delayed and had to be provided in a series of subsequent steps before the proper amount of firmware could be provided to the target digital modules.

The present system uses a library-exported interface to issue command requests. Then by adding a SCSI Inquiry command and querying the target device with information from a Page Code field, it was possible to retrieve the firmware numbers page. Thus the information returned contained the appropriate firmware release numbers and the servo RAM release numbers which the utility program could integrate this information in order to download the correct firmware.

The present disclosure provides a special SCSI Inquiry command which provides required information to produce access to the correct firmware, which can be downloaded in multiple cycles through the offices of a selective single or dual system array capacity, which overcame the limitations and delays caused by the earlier systems.

FIG. 1B shows the basic relationship between different software drivers and how they are utilized in the overall operation of a SCSI environment. Normally the Device Drivers 74, 76, 68, etc. will reside in the central processing unit's RAM 73 and they are loaded via the systems configuration utility program during the boot operation. In the disk operating system (DOS) environment, a program CONFIG.SYS provides a host computer with its operational parameters. The HA (Host Adapter) driver 82 resides in the host adapter 80 usually in some type of memory, such as EPROM.

The operating system 72, which calls a target driver, connects the various application programs 70a, 70b, 70c, over to either the tape driver 74, the disk driver 76 or the CD ROM driver 78. These then connect to the host adapter (HA) 80 and the HA number 1 driver 82. The HA driver requests command control blocks (CCB's) from the RAM 73 in the CPU. The data is then conveyed on SCSI bus 37 over to the peripheral controller 40, which has the controller firmware 86 which has to be loaded. The small computer systems interface (SCSI) uses the concept of host memory blocks for Command, Data, and Status, which will be interchanged between the host computer and the SCSI device. The host memory blocks are prepared by the host and managed by the host adapter. These host memory blocks must actually be found by the peripheral device which is attached to the host adapter. This is accomplished through what is known as "Pointers".

FIG. 1C shows the basic physical components of a SCSI based system. These are items which include the "Initiators" which involve usually host adapters, (HA), that is to say, the devices that initiate an I/O process. Then there are the modules which involve the peripheral controllers, that is to say the devices that control the I/O process and are shown in the lower portion of FIG. 1C. There are also the Logical Units which are the physical peripheral devices, that is to say, modules where the data is stored or retrieved, and in addition there is the SCSI bus, which is the connection between the initiators and the targets.

Thus, FIG. 1C shows how information is transferred from the application program 70 over to the physical target device 96. FIG. 1C shows the application program 70 which is applied to the operating system 72, which connects to the target device driver 75x. Here there is a two-way communication between 75x and the host adapter driver 82, which then connects to the SCSI chip 86. This first set of modules involve the host system and from thence the connections go on the SCSI bus 37, showing the command status, the message and monitor bus phases, and the arbitration selection re-selection transfer data. Thus the SCSI chip 86 connects to the SCSI chip 88 which loads the firmware 90. The SCSI chip 88 also loads the buffer 92, which is connected to the drive electronics 94, which operates the physical target device 96.

The present invention provides a faster and more efficient method for downloading firmware to a selected peripheral controller while selecting appropriate firmware for a target medium and enabling the download to occur with a minimum of sequential commands and often accomplishing the download in just one download command.

SUMMARY OF THE INVENTION

The present system involves a method for downloading large volumes of SCSI firmware and servo firmware from an operating system over to SCSI devices using a set of two specialized two-dimensional arrays to overcome the limitations of systems array capacity.

Earlier utility programs used for downloading SCSI firmware involved a single dimensional buffer array which utilized a single download command. The presently developed method utilizes a library-exported interface to issue multiple command requests. In addition, it adds a SCSI Inquiry command to query the target device with information from a Page Code field where it was then possible to retrieve the firmware page number.

This information then provides appropriate firmware release numbers and servo RAN release numbers which the ongoing utility program could integrate in order to download the correct firmware and provides for the download in a single cycle through the use of dual two-dimensional system capacity arrays. Thus, extremely large volumes of firmware can often be downloaded in a single command cycle and the system provides reliability by enabling a checkout to occur that the proper firmware has been downloaded.

A selection is made as to use of a single dimensional array or a dual two-dimensional array for buffer loading. Further, check-sequences are provided to determine whether the download of firmware is merely the same as the already-installed firmware or whether the new firmware is new and different from the priorly loaded firmware.

BRIEF DESCRIPTION OF THE DRAWINGS

FIG. 2 is a sketch showing a typical example of a Command Descriptor Block;

FIG. 3 is a drawing of the Write Buffer Command used in conjunction with the Read Buffer Command, which can be utilized as a diagnostic function for testing the integrity of the delivery system;

FIG. 4 is a diagram showing the Write Buffer Mode field;

FIG. 5 is a drawing which displays the elements of the Operation Code;

Glossary of Related Items

Figure 1A:
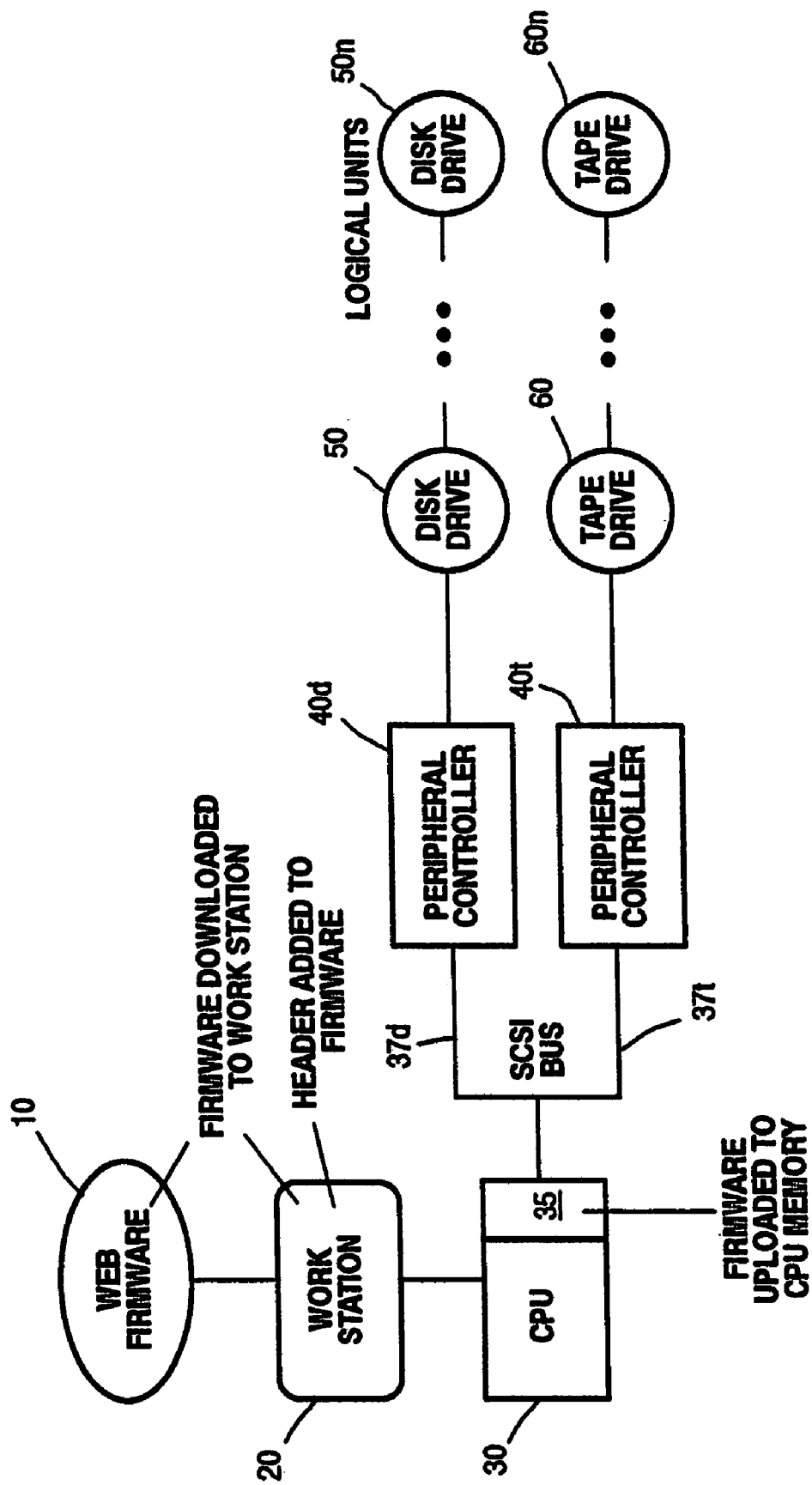
FIG. 1A is an overall system drawing showing the environment in which the present method can be implemented.
Figure 1B:
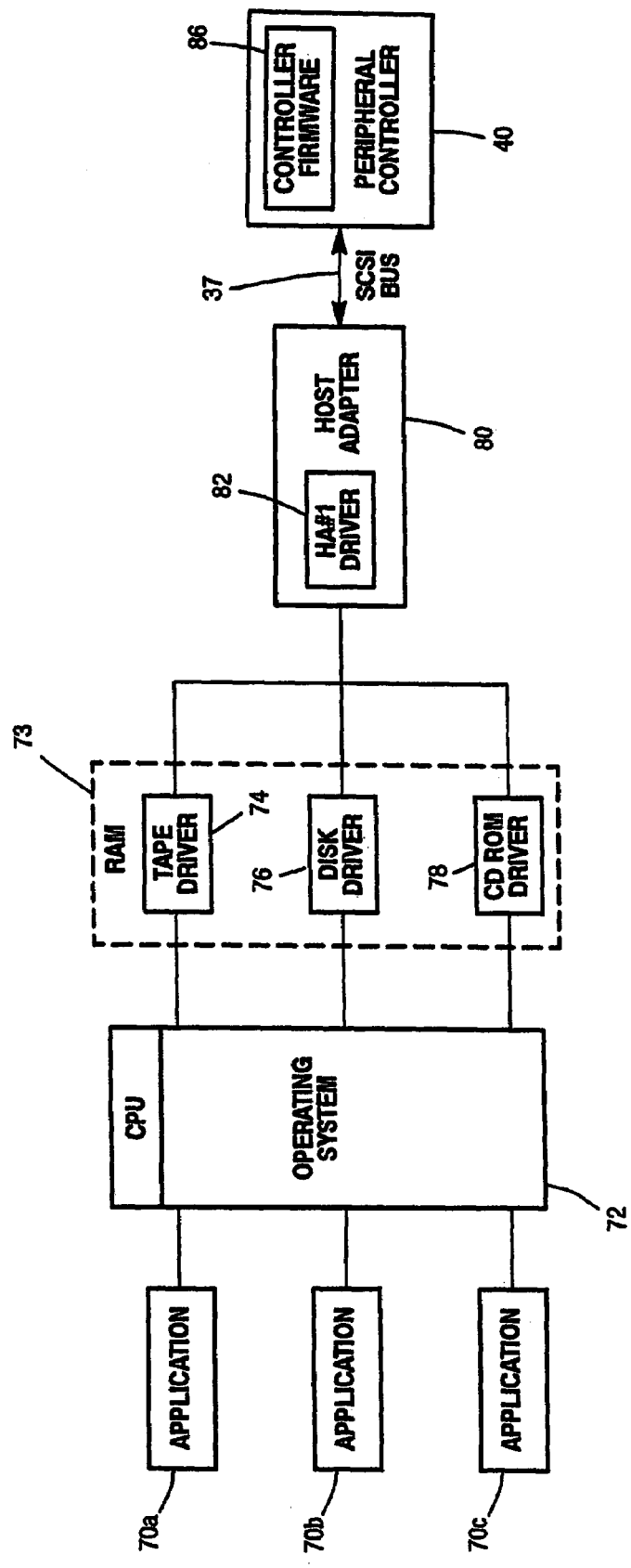
FIG. 1B is a drawing showing the use of different software drivers in a SCSI environment.
Figure 1C:
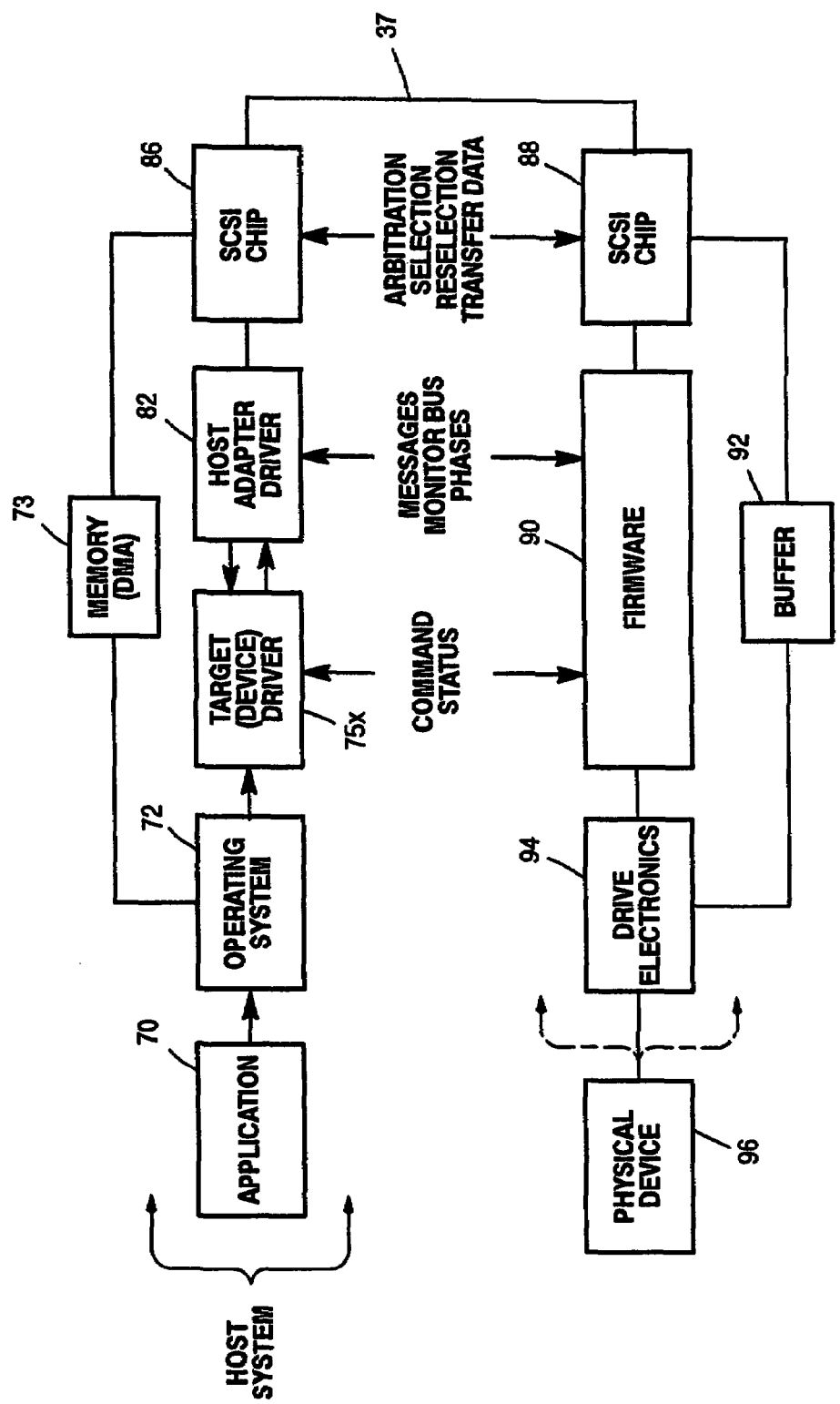
FIG. 1C is a drawing showing how information is transferred from an Application Program to the physical target device.

BUFFER ARRAY:—is a temporary area of memory used to store data when issuing a SCSI Read or Write command. This array can be a multiple dimensional array.

BUFFER ID:—This is a field of data which identifies a specific buffer within the Logical Units. The buffer ID is assigned by the Vendor to identify different buffers if more than one is used during the data transfer. The reason for using more than one buffer is for efficiency. For example, if a user is using two buffers while the first buffer is being used to transfer the first data block, the second one is being loaded with the next contiguous offset data block.

BUFFER OFFSET:—is a scheme to facilitate skipping over data that has already been transferred with a Read/Write command and provides an offset from the start of the buffer to indicate where the new data transfer will start.

CDB:—stands for Command Descriptor Block. A SCSI command is executed by sending a Command Descriptor Block to the target. The first byte of the CDB is the Operation Code which has a Group field which describes the number of command bytes in the CDB. The lengths can be six, ten or twelve bytes. It also has the Command Code for example 3B (hex) for the Write buffer command. The other major fields in the CDB are LUN (Logical Unit Number) which is the LUN of the target device; LBA (Logical Block Address) field which is the address on the device where the transfer will start/commence such as during a Read or Write operation. Another important field is the Transfer Length Field which specifies the amount of data to be transferred, usually the number of blocks. These blocks can all be the same length or of variable length. A CDB may also have a Parameter List Length Field which specifies the number of bytes sent out with a particular parameter. The last byte in a CDB is the Control Byte Field which is vendor specific.

COMMA SEQUENCE ERROR:—This is when an improper sequence of software commands occur It is detected by the Sense Code.

CONTROLLER:—is the hardware and firmware that control the disk or tape device. There may be many devices or a single device under the control of the controller. This firmware normally resides in the flash prom. It can be updated or replaced by a download software utility program.

CONTROLLER INQUIRY ATTRIBUTES:—is the data received after an inquiry of the Controller. The following is an example of the data returned by this command: Vendor identification, data identifying the vendor of the product such as Unisys; Product Identification, data defined by the vendor to identify the product; Product Revision level, data as defined by the vendor to identify the revision of the product. This information is used by the download utility program to verify and insure that the proper firmware is being downloaded to the device.

CONTROL MEMORY SPACE (of the Logical Unit):—is the ROM memory in the Logical Unit where the Control Program/firmware resides.

DATA-OUT-BUFFER:—is the memory buffer area used to temporarily store the data for an outbound data transfer such as in a WRITE command.

DFAST UTILITY PROGRAM:—(Download For All SCSI Targets) is a utility program that downloads microcode/firmware to SCSI devices such as controllers for disk drives and tape drives attached to a Unisys A-Series computer system.

EVPD:—(Enable Vital Product Data) is a bit in the SCSI Inquiry command that when set to a logical "1" it specifies that the target/device shall return the vital product data specified by the page code field. When this bit is set to "0", the target shall return the standard Inquiry data.

EVPD SET:—is bit 0 located in byte 1 of the Inquiry command called the Enable Vital Product Data bit. When this bit is set to a logical "1" it specifies that the target/device shall return the vital product data specified by the page code field. When this bit is set to "0" zero the target shall return the standard Inquiry data.

FIRMWARE HEADER:—is an 8192 byte header appended to the front end of the firmware that standardizes the format of the firmware file which will simplify the task of reading the firmware file by the system application program. Some of the specified data required to build the header are: Customer ID, Size of header record, Size of firmware data, New firmware level, Vendor ID, Number of drive ID, Number of replaceable firmware levels, Firmware levels, and Drive IDs.

FIRMWARE NUMBERS PAGE:—is the name of the page that provides the firmware version numbers.

FIRMWARE RELEASE NUMBERS:—is a scheme used to identify a particular version or level of firmware that has been released to the customer. It can be an initial firmware release or an updated firmware release which provides a fix or feature to the firmware. It is also the firmware release number returned in page C0h (bytes 4 thru 11) when the EVPD bit is set in the Inquiry Command.

GOOD STATUS:—Means that the command that was issued was successfully completed or that the requested operation is satisfied. This occurs when the initiator (CPU) receives "ooh" in the Status Byte Codes. A Status Byte is sent from the target/peripheral controller to the Initiator during the STATUS phase at the completion of each command (unless the command is terminated by an ABORT message, reset condition or an unexpected disconnect).

ILLEGAL REQUEST:—Indicates that there was an illegal parameter in the command descriptor block or in the additional parameters supplied as data for some commands or that the command being issued is not supported by the device.

INQUIRY COMMAND:—This is an ANSI SCSI command which was sometimes called the Attributes Command. This command has the EVPD bit set to Enable Vital Product Data that contains the Servo Revision information. This is a command from the CPU via a Channel Adapter which was sent to the target device (controller) to get information about the vendor, the Product ID, and Product Revision Level. See also CONTROLLER INQUIRY ATTRIBUTES.

LOGICAL UNITS:—Are usually assigned to unit-groups such as peripheral devices. Each group has one or more logical units, beginning with logical unit "0" up to a maximum of eight Logical Units. A Logical Unit is the device, such as a disk or tape, attached and controlled by a target/peripheral controller. These Logical Units can have a 1-to-1 relationship with a physical drive or, if in a RAID configuration, may have 2 or more physical disks per Logical Unit.

LOGICAL UNIT BUFFER:—Is the temporary or buffer storage area in RAN used by a logical unit to temporarily store data before it is written to permanent storage such as disk, tape, or PROM during a read-write command.

MODE CONTROL:—As seen in FIGS. 3 and 4, are SCSI commands that allow downloading of data depending on the value of the Mode field in the Write Buffer command. Bits 0 through 2 of byte 1 of the Write Buffer command defines the Mode Control. A value of 4 is download microcode to the target. A value of 5 is download microcode and save. A value of 6 is download microcode with offsets. And a value of 7 is download microcode with offsets and save.

MASTER CONTROL PROGRAM (MCP):—The operating system developed for the Unisys Corporation A-Series computer system platforms.

ONE DIMENSIONAL ARRAY:—For example A[0:9] is a one dimensional array with 10 elements. It can hold 10 items or numbers. The first number inside the brackets (0) is the lower boundary and the second number inside the brackets (9) is the upper boundary.

PAGE CODE FIELD:—specifies which page of vital product data information the target/device shall return. The information in this page is usually firmware version numbers.

READ INQUIRY:—Read Inquiry is used to read the Vendor Identification, Product Identification, Product Revision level and Vendor-Specific data. This information is used to verify that the firmware download is the proper firmware for this device. This is accomplished by comparing the Read Inquiry data with the information provided in the firmware header file.

READ BUFFER DESCRIPTOR:—The READ BUFFER command is used in connection with the WRITE BUFFER command as a diagnostic for testing target memory and SCSI bus integrity. The READ BUFFER DESCRIPTOR is defined by the Mode Field of the READ BUFFER command byte 1, bits 0, 1 & 2. When bits 0 & 2 are set, the READ BUFFER DESCRIPTOR returns 4 bytes of data. Byte 0 is the Offset Boundary alignment within the selected buffer for subsequent WRITE BUFFER and READ BUFFER commands. Bytes 1, 2 & 3 is Buffer Capacity, and returns the size of the selected buffer in bytes.

RECOVERY PROCEDURE:—Is a procedure used by a target/device to recover from a data error during a read/write operation. This procedure may entail offsetting the head position from the track center, reallocating of the defective data blocks, or through a software algorithm such as the ones used in RAID configurations.

SCSI INQUIRY COMMAND:—is used by a system to determine the configuration of the SCSI device. Target devices respond with information that includes their type and standard level and may include the vendor's identification, product identification model number, product revision level and other useful information, such as vendor specific data.

SCSI FIRMWARE:—is firmware that interprets and carries out the SCSI commands. It makes sure that the data is properly written or read and provides recovery procedures when errors are encountered.

SENSE KEY:—is a 4 bit code, bits 0–3 of byte 2 of the sense data received after a Request Sense command that describes an error or exception condition.

SERVO FIRMWARE:—is firmware that positions and controls the tracking of the head assembly over the data tracks on a disk drive to insure proper data during read or write operations.

SERVO RAM RELEASE NUMBER:—is the release level of the Servo RAM firmware. This data is returned in page C0h bytes 12 thru 19 when the EVPD bit is set in the Inquiry Command.

TARGET INQUIRY DATA:—is the information provided by the Inquiry command from either a disk or tape device. Some of the information returned is Vendor Identification, Product Identification, and Product Revision level.

TEST UNIT:—This is a command that allows an Initiator to poll a Logical Unit (LUN) to recognize when a Logical Unit is ready to be accessed without any need to allocate space for returned data. Sometimes the firmware can transfer data transmission from a SCSI narrow mode to SCSI wide mode. The Test Unit command can use a re-selection of the transfer mode by updating the properties of the Logical Unit.

TWO-DIMENSIONAL ARRAY:—For example A[0:9,0:19] is a two-dimensional array. The first set of numbers (0:9) inside the brackets is the number of rows which is 10 and the second set of numbers (0:19) inside the brackets is the number of elements in each row which is 20.

UNIT ATTENTION CONDITION:—indicates that the removable medium may have been changed or the target has been reset. A target/peripheral controller will generate a Unit Attention condition for each Initiator on each Logical Unit whenever the Target has been reset by a hard reset, power-on reset, or Bus Device reset. In this way, the Logical Units can inform the target/peripheral controller that they are up, ready and operational.

USERMAINTREQUEST:—is an MCP (Master Control Program) software module that provides an interface to the DFAST utility program in order to perform its task of downloading firmware.

DESCRIPTION OF PREFERRED EMBODIMENT

Referring to FIG. 1, there is seen the overall operating environment in which the present system for enhanced downloading of firmware (microcode) is accomplished in a rapid and efficient manner.

The web firmware 10 is seen being downloaded to a workstation 20 which adds a header to the firmware involved. This is then conveyed to the central processing unit 30 which uploads the firmware to the central processing unit's main memory 35.

The firmware is then passed to the peripheral controller 40d which can then load this on to the disk drive 50. The firmware in memory 35 is transmitted to peripheral controllers $40_d$ and $40_t$ as in time respectively via the SCSI busses $37_d$ and $37_t$.

Likewise, the firmware in the memory 35 can also be loaded to a peripheral controller 40t to the tape drive 60.

The disk drive 50 and the tape drive 60 are representative of a series of logical units (50n, 60n) which may be viewed as a set of multiple modular units.

Figure 1D:
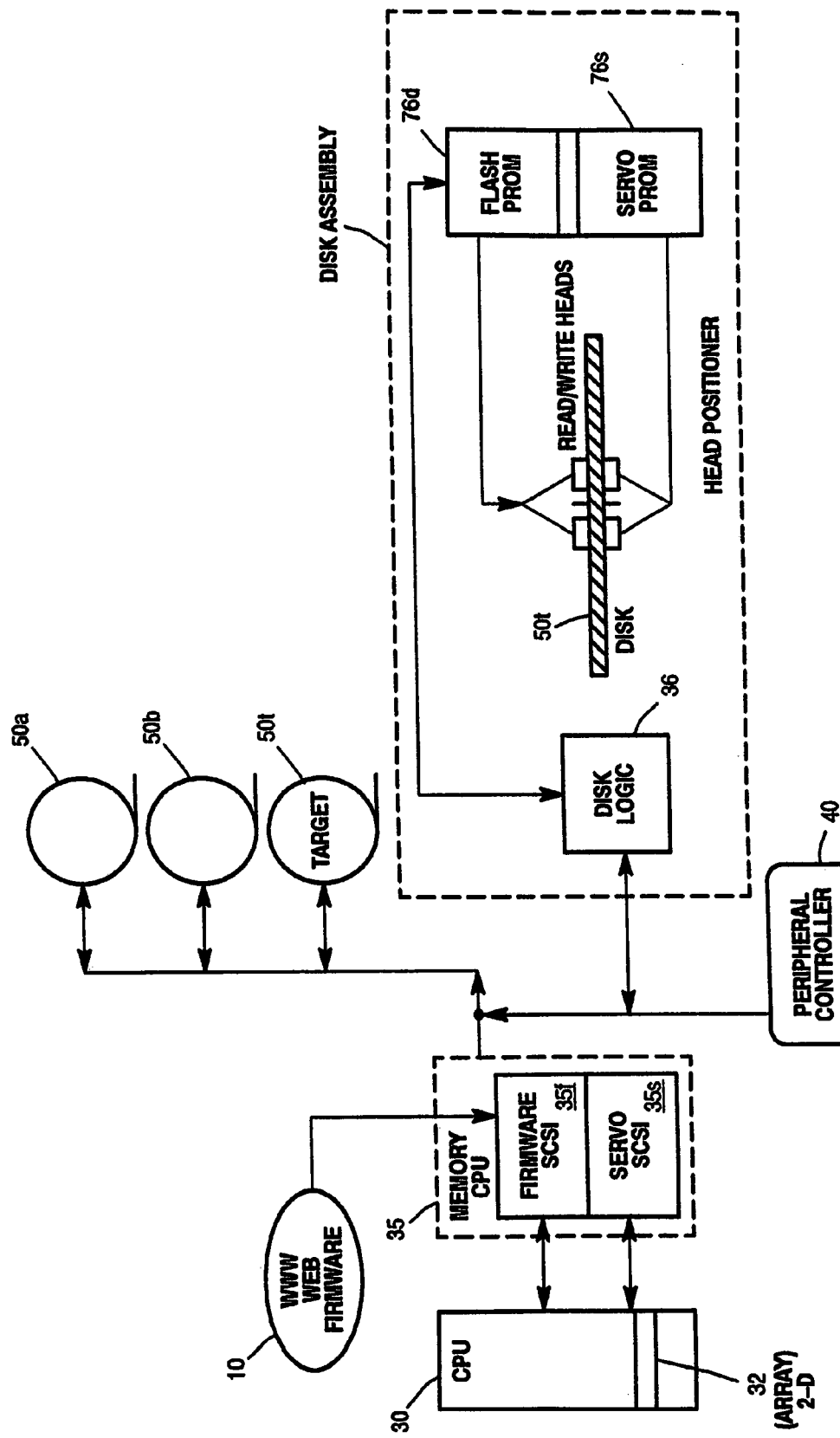
FIG. 1D is an overall operational diagram for a disk control target.

Referring to FIG. 1D, there is seen an overall system diagram to illustrate the functional operation of the present invention. For example, there is seen in FIG. 1D, a World Wide Web 10 which can supply firmware which can be downloaded into a CPU memory 35 which is operated by the CPU 30. The memory 35 will be seen to have a microcode firmware for SCSI 35f, and the servo firmware SCSI 35s. This information can be temporarily loaded into disk drives 50a and 50b for temporary storage purposes.

Subsequently, the peripheral controller 40 will communicate with a flash PROM 76d and a flash PROM 76s. These function to place the SCSI firmware in the flash PROM 76d, and the servo SCSI firmware in the servo flash PROM 76s. The flash servo PROM firmware will provide the head positioning for the Read/Write heads over the target disk 50t while the flash PROM 76d will load the data through the Read/Write heads on the opposite side of disk 50t.

Referring to FIG. 2 there is shown a typical example of a Command Descriptor Block. In this case, the illustration shows a 12-byte block. Thus a SCSI command is executed by sending a Command Descriptor Block to the target, such as the logical units 50 or 60 of FIG. 1. The first byte of the Command Descriptor Block (CDB) is the Operation Code which has a Group field which describes the number of Command bytes in the CDB. For example, the byte sizes can be 6 bytes, 10 bytes, or 12 bytes, which is the example shown in FIG. 2.

The Operation Code of FIG. 2 is made of two fields shown as the Group Code and the Command Code (as illustrated in FIG. 5). The other important fields of the CDB of FIG. 2 are the Logical Unit Number (LUN) which is the logical unit number of the target device. Further, the CDB has a Logical Block Address (LBA) field, which is the address on the target device where the transfer will start or commence such as during a Read or a Write operation. Another field of the CDB at FIG. 2 is the Transfer Length Field which specifies the amount of data to be transferred, usually as a number of blocks. The blocks can be all of the same length or of a variable length. The CDB may also have a Parameter List Length Field which specifies the number of bytes sent out with a particular parameter. The last byte in the CDB is the Control Byte Field which is specific to a given vendor.

Thus, as a result of the head positioning firmware and the Read/Write heads which can receive the firmware from the World Wide Web 10, these can now be placed on the final physical target disks, such as disk 50t.

FIG. 3 is a drawing of the Write Buffer command which is used in conjunction with the Read Buffer command as a diagnostic function for testing logical unit memory in the target SCSI device and for testing the integrity of the service delivery subsystem. There are additional modes which are provided for downloading microcode and also for downloading and saving the microcode.

In FIG. 3, the horizontal top portion shows the sections indicating seven bits while the vertical column at the left indicates a total of 10 bytes (0–9). The byte "0", indicates the Operation code (3Bh). The byte "1" is reserved at bits 3 thru 7 while bits 0 thru 2 provide the "Mode Field" seen later in FIG. 4.

In FIG. 3, byte "2" is the buffer identification designated "Buffer ID". Bytes "3" thru "5" are the buffer offset area for data which encompasses the most significant bit (MSB) to the least significant bit (LSB).

In FIG. 3, the bytes "6" thru "8" provide for the parameter list length and also indicate the most significant bit to the least significant bit. Then byte "9" is the control statement which is the final informational portion of the Write Buffer Command.

The function of this Write Buffer Command and the meaning of the fields within the Command Descriptor Block (FIG. 2) depend on the contents of the "Model" field, FIG. 4.

Referring to FIG. 4, there is seen a diagram of the Write Buffer Mode field. It should be noted that when the system is downloading microcode with buffer offsets, then the Write Buffer Command Mode should be 110b or 111b (FIG. 4).

Referring to FIG. 4, there is seen the mode 000b designated as the Write Combined Header and Data Mode. In this mode, data to be transferred is proceeded by a four-byte header. The four-byte header consists of all reserved bytes. The buffer ID in the buffer offset fields are made to "zero." The parameter list length field specifies the maximum number of bytes that are to be transferred from the Data Out Buffer. This number includes four bytes of header so that the data length to be stored in the device buffer is the parameter list length minus four. If the parameter list length exceeds the buffer capacity, then the device service must return "Check Condition" status and sets the sense key to "Illegal Request."

The next mode seen in FIG. 4 is the 001b or vendor-specific mode. Here, the meaning of the buffer ID, the buffer offset, and the parameter list length fields are not specified, but are determined by Vendor-data.

The data mode 010b entitled "Write Data" indicates that the Data-Out Buffer contains buffer data destined for the logical unit of a selected target. The buffer ID field identifies a specific buffer within the logical unit. The vendor assigns buffer ID code to certain buffers within the logical unit. The buffer ID "zero" is supported here. If more than one buffer is supported, then additional buffer ID codes must be assigned contiguously beginning with "1" (one). If an unsupported buffer ID code is selected, the device must then return "Check Condition" status and then sets the sense key to "Illegal Request" with additional sense code of "Invalid Field In CDB."

Data is written to the logical unit buffer starting at the location specified by the buffer offset. The application client must conform to the offset boundary requirements returned in the Read Buffer descriptor. If the device server is unable to accept the specified buffer offset, it must return Check Condition status and then sets the sense key to Illegal Request with an additional sense code of Invalid Field In CDB.

The parameter list length specifies the maximum number of bytes to be transferred from the Data Out Buffer to be stored in the specified buffer beginning at the buffer offset. The application client must attempt to ensure that the parameter list length plus the buffer offset does not exceed the capacity of the specified buffer. The capacity of the buffer may be determined by the buffer capacity field in the Read Buffer descriptor. Here again, if the buffer offset and parameter list length fields specify a transfer in excess of the buffer capacity, the device must return a status of Check Condition and then sets the sense key to Illegal Request plus the additional sense code of Invalid Field In CDB.

It should be noted that the present embodiment with double two-dimensional arrays provides an unusually large capacity buffer allowing firmware (=393,216 bytes or less) download in a single command cycle instead of multiple download cycles.

The next level in the Write Buffer mode field is the Download Microcode Mode, 100b. Now if the logical unit (target) cannot accept this command due to some device condition, then the device server must terminate each Write Buffer command with this mode 100b and a Check Condition status, plus a sense key of Illegal Request. It then sets the additional sense code to read Command Sequence Error. In this mode, the vendor-specific microcode or control information is transferred to the control memory space of the logical unit. After a power-cycle or reset, the device operation will revert to a vendor-specific condition. The meanings of buffer ID, buffer offset, and parameter list length fields are not presently specified and are not required to be filled with zeros. When the microcode download has completed successfully, the device will generate a unit attention condition for all initiators except the one that has issued the Write Buffer command. Then an additional sense code will be set to indicate Microcode Has Been Changed.

Now referring to the Write Buffer mode field at FIG. 4, the next item is the mode 101b designated Download Microcode and Save. If the logical unit (target) cannot accept this command because of some condition, the device server will terminate each Write Buffer command with this mode designated 101b and with a Check Condition status, plus a sense key of Illegal Request and then will set the additional sense code to Command Sequence Error. In this mode, any vendor-specific microcode or control information is to be transferred to the logical unit, and if the Write Buffer command is completed successfully, will also be saved in a non-volatile memory space, such as a semi-conductor, a disk or other medium. The downloaded code will be effective after each power cycle and reset until it is supplanted in another download microcode and save operation. The meanings of the buffer ID, buffer offset, and parameter list length fields are not required to be zero-filled. When the Download Microcode And Save Command has completed successfully, then the device will generate a unit attention condition for all initiators except the initiator that issued the Write Buffer command. When reporting the unit attention condition, the device will set the additional sense code to Microcode Has Been Changed.

The next item in FIG. 4 is the mode 110b designated as Download Microcode With Offsets. In this mode the application client may split the transfer of the vendor-specific microcode or control information over two or more Write Buffer commands. If a logical unit cannot accept this command because of some device condition, the device will terminate each Write Buffer command with this mode, 110b, with a Check Condition status, also a sense key of Illegal Request and set the additional sense code to Command Sequence Error.

If the last Write Buffer command (of a set of one or more commands) completes successfully, the microcode or control information is transferred to the control memory space of the logical unit. After a power-cycle or a reset, the target device shall revert to a vendor-specific condition. In this mode, the Data-Out Buffer contains vendor-specific, self-describing microcode control information.

Since the downloaded microcode or control information is sent using several commands, then when the logical unit detects the last Download Microcode With Offsets And Save mode Write Buffer command which has been received, the device will perform any logical unit required verification of the complete set of downloaded microcode or control information prior to returning Good Status for the last command. After the last command completes successfully, the device server will generate a Unit Attention condition for all initiators except the one that issued the set of Write Buffer commands. When reporting the Unit Attention condition, the device will set the additional sense code to "Microcode Has Been Changed."

If the complete set of Write Buffer commands required to effect the microcode or control information change (one or more commands) are not received before a reset or power-on cycle occurs, then the change shall not be effective and the new microcode or control information will be discarded.

The buffer ID field (Byte 2 of Write Buffer Command, FIG. 3) identifies a specific buffer within the logical unit. The vendor assigns buffer ID codes to the buffers within the logical unit. A buffer ID value of zero will be supported. If more than one buffer is supported, additional buffer ID codes are assigned contiguously beginning with one. If an unsupported buffer ID code is identified, then the device will return the status of Check Condition and will also set the sense key to Illegal Request with an additional sense code of Invalid Field In CDB.

The microcode or control information is written to the logical unit buffer starting at the location specified by the buffer offset. The application client will send commands that conform to the offset boundary requirements. If the device is unable to accept the specified buffer offset, it will then return the Check Condition status and set the sense key to Illegal Request with the additional sense code of Invalid Field In CDB.

The parameter list length specifies the maximum number of bytes that must be present in the Data-Out Buffer to be stored in the specified buffer beginning at the buffer offset. The application client must attempt to ensure that the parameter list length plus the buffer offset does not exceed the capacity of the specified buffer. If the buffer offset and parameter list length fields specify a transfer in excess of the buffer capacity, the device will return the status of Check Condition and set the sense key to Illegal Request plus the additional sense code of Invalid Field In CDB.

Figure 6:
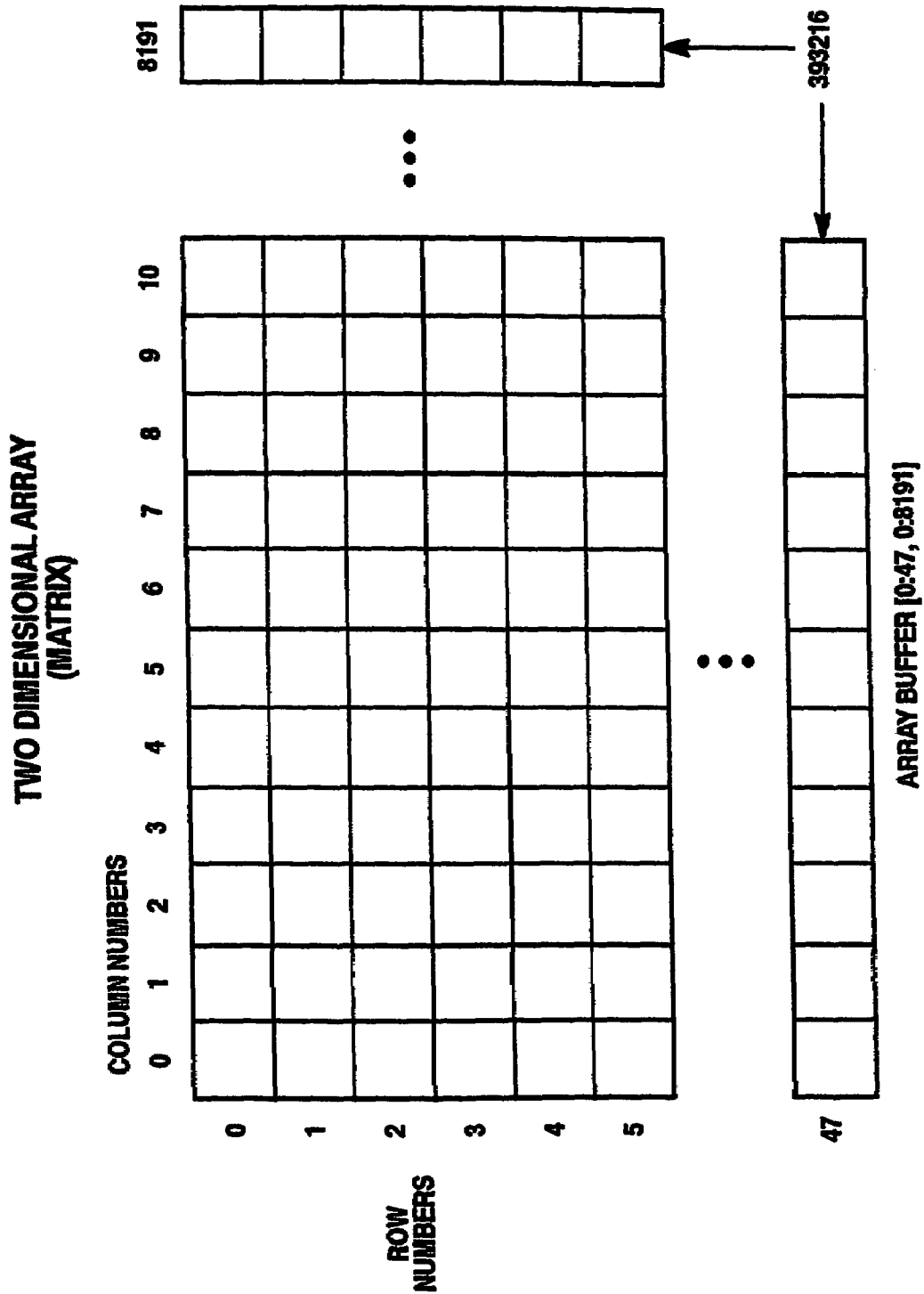
FIG. 6 is a drawing illustrating a two-dimensional array which can provide the buffering arrangement for firmware which is to be downloaded to a SCSI target control device.

With the expanded double two-dimensional array of FIG. 6, there is no longer any hang-up over buffer capacity which is now usually more than enough capacity. The final line in the Write Buffer mode field of FIG. 4 is designated as 111b and indicates the operation designated Download Microcode With Offsets And Save mode. In this mode, the initiator may split the transfer of the vendor-specific microcode or control information over two or more Write Buffer commands. If the logical unit cannot accept this command because of some device condition, the device will terminate each mode 111b Write Buffer command with a status of Check Condition plus the sense key of Illegal Request plus the additional sense code to designate Command Sequence Error.

If the last Write Buffer command of the set of one or more commands completes successfully, the microcode control information is saved in a non-volatile memory space such as semi-conductor or disk or other target media. Now since the downloaded microcode or control information may have been sent using several commands, then when the logical unit detects the last download microcode with offsets and save mode Write-Buffer commands that have been received, the device server performs any logical unit-required verification of the complete set of downloaded microcode or control information prior to returning the status of "Good" for the last command.

The buffer ID field identifies a specific buffer within the logical unit, as discussed hereinbefore.

The parameter list length also specifies the maximum number of bytes that can be present in the Data-Out Buffer to be stored in the specified buffer beginning at the buffer offset. As before, if the buffer offset and parameter list length field specify a transfer in excess of buffer capacity, the device will return the Check Condition status, as described hereinbefore.

FIG. 5 is a diagram which lays out the Operation Code. As seen, the Operation Code uses bits 0–4 for the Command Code and bits 5 thru 7 for the Group Code. All devices implement their commands with a mandatory operation code in the appropriate section for their device types. For example, a command is executed by sending a Command Descriptor Block (CDB) to the target logical device. For each of the Command Descriptor Blocks (CDB, FIG. 2), it will be noticed that the first byte (bytes) of the CDB will be the Operation Code while the last byte (byte 11) of the CDB will be the Control Byte.

Thus, each Operation Code has a Group Code field and a Command Code field. It will be noted that the three-bit Group Code field provides for 8 groups of command codes while the five-bit Command Code provides for 32 Command Codes for each Group.

Thus, as seen in FIG. 5 under the Group Code field, group zero has 6 command bytes, group 1 has 10 command bytes, group 2 has 10 command bytes for a new version of SCSI-2, while groups 3 and 4 are reserved, and group 5 has 12 command bytes, while 6 and 7 are specific to a given vendor as to the number of command bytes to be involved.

FIG. 6 is a drawing which illustrates the two-dimensional array involved in the SCSI download. This is actually implemented doubly to establish two of the two-dimensional arrays. Each array will be seen to have a number of rows; for example, this may be 10 rows. Then each row will have a number of elements for digital units, for example, this may be 20. This type of dimensional array would be described as A[0:9,0:19] which would indicate that there are 10 rows designated 0 through 9, and each row has 20 digital units designated as 0:19. At least two of such two-dimensional arrays are provided in this embodiment which allow the download cycle in one operation rather than a series of concatenating cycles.

FIG. 6 is an illustration of a two-dimensional array, which in this example is seen to hold 393,216 bytes.

Referring to FIG. 6, the array buffer which is designated as 0:47, 0:8191 is shown to indicate that there are 48 row numbers numbered from 0 thru 47 and at the same time there are 8,192 column numbers.

The array shows a series of blocks or slots, each of which can hold an eight-bit byte of information. As a result, since there are 48 rows and each row has 8,192 bytes, then the two-dimensional matrix array will provide a totality of 393,216 bytes of information.

Figure 7A:
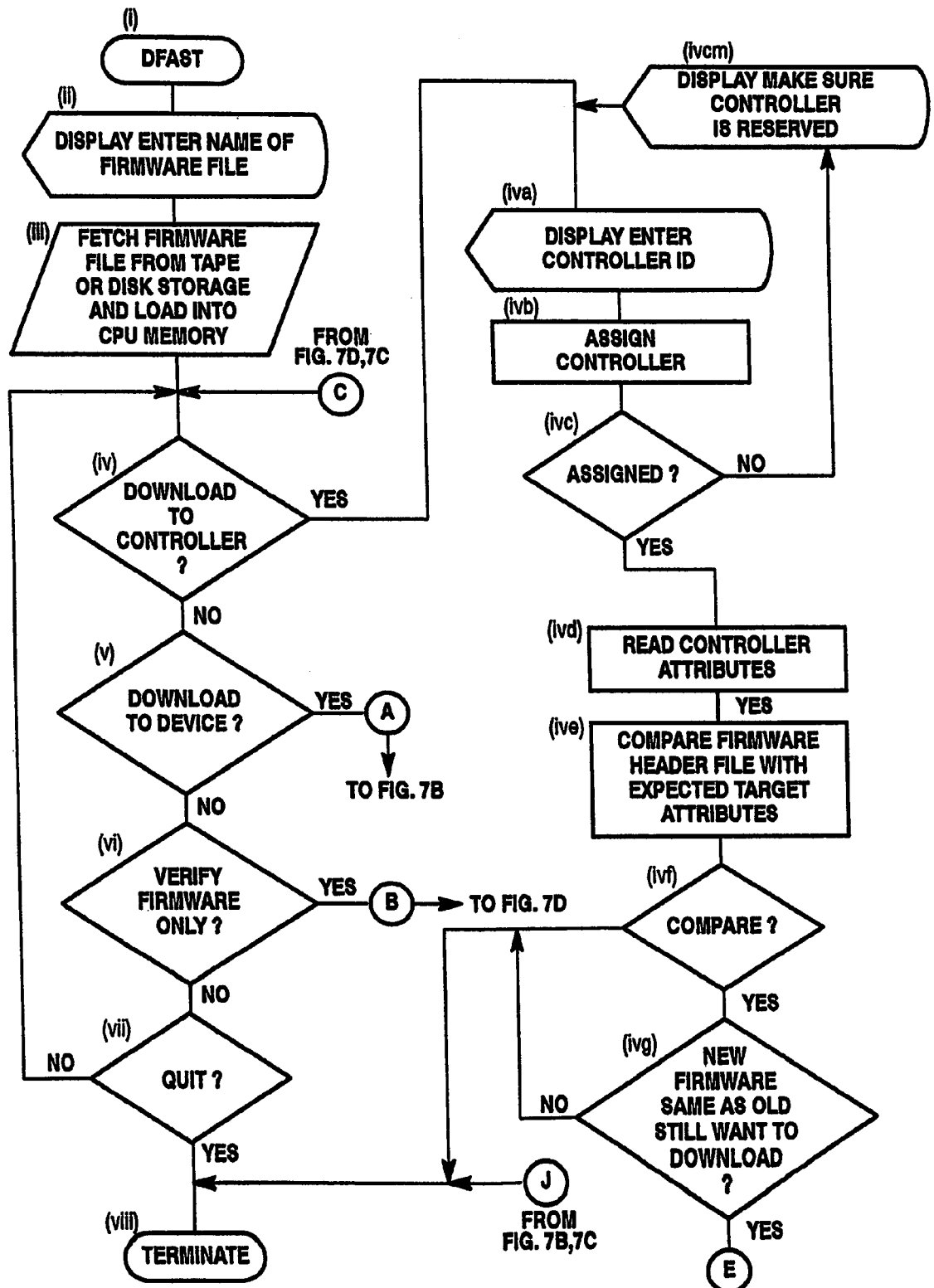
FIGS. 7A, 7B, 7C and 7D are flow charts illustrating the steps involved to implement the download operation to SCSI target control devices.

FIG. 7A is a flow chart indicating the steps involved for implementing the specialized download operation to a particular SCSI target. Referring to FIG. 7A, the first step (i) is designated DFAST which is a particular utility program used to download firmware for SCSI targets. This program thus downloads microcode/firmware to SCSI devices, such as disk drives or tape drives which are attached to a Unisys A-Series computer system.

The second step (ii) involves entering the name of the firmware file involved so that this file can be accessed from memory.

At step (iii) the sequence will then fetch this particular firmware file, after which it can proceed to step (iv).

Step (iv) is a decision block as to whether this firmware file will be downloaded to the peripheral controller or not. If this is to be downloaded to the controller (YES), then the sequence proceeds to step (iva). If the firmware file is not to be downloaded to the controller (NO), then the sequence proceeds to step (v) which is another decision block which poses the question whether the firmware is to be downloaded to the target device. If the answer here is (YES), then the sequence proceeds to reference mark A. If the answer is (NO) at step (v), then the sequence proceeds to step (vi) which is a decision block as to whether there should be a verification of the firmware only. If the answer here is (YES), then the procedure goes to mark B. If the answer is (NO), then at step (vii), the program will terminate at this point.

Referring to FIG. 7A at step (iv) which involves a decision point whether to download to the controller. Here, if the answer is (YES), then the sequence proceeds to step (iva) where there is a need to display and enter the "controller ID" to select the appropriate peripheral controller. The next step is step (ivb) which involves the assignment of the controller, after which there is a decision block. At step (ivc) there is involved a question as to whether the peripheral controller has been assigned for utilization.

If the answer is (YES), that is to say a controller has been assigned, then the sequence proceeds to step (ivd) which involves a reading of the controller attributes.

The next step is (ive) where there is a comparison made to compare the firmware header file with the expected target attributes. After this, at comparison step (ivf), a decision block is reached as to whether the firmware header file is the same as the target attributes. Here, if the answer is (YES), then the sequence proceeds to the step (ivg) which involves another decision block querying whether the sequence will still want to download. If the answer here is (YES), then the procedure continues on via reference mark E to FIG. 7D.

Returning back to step (ivc), if there has not been an assignment of a controller (NO), then the sequence proceeds to step (ivcn) in order to recycle back to step (iva) to make sure that a controller is reserved for this function.

Now, returning to step (ivf), if the compared file firmware is not the same as the target firmware (NO), then the next sequence is indicated in step (viii), i.e., to Terminate.

Figure 7B:
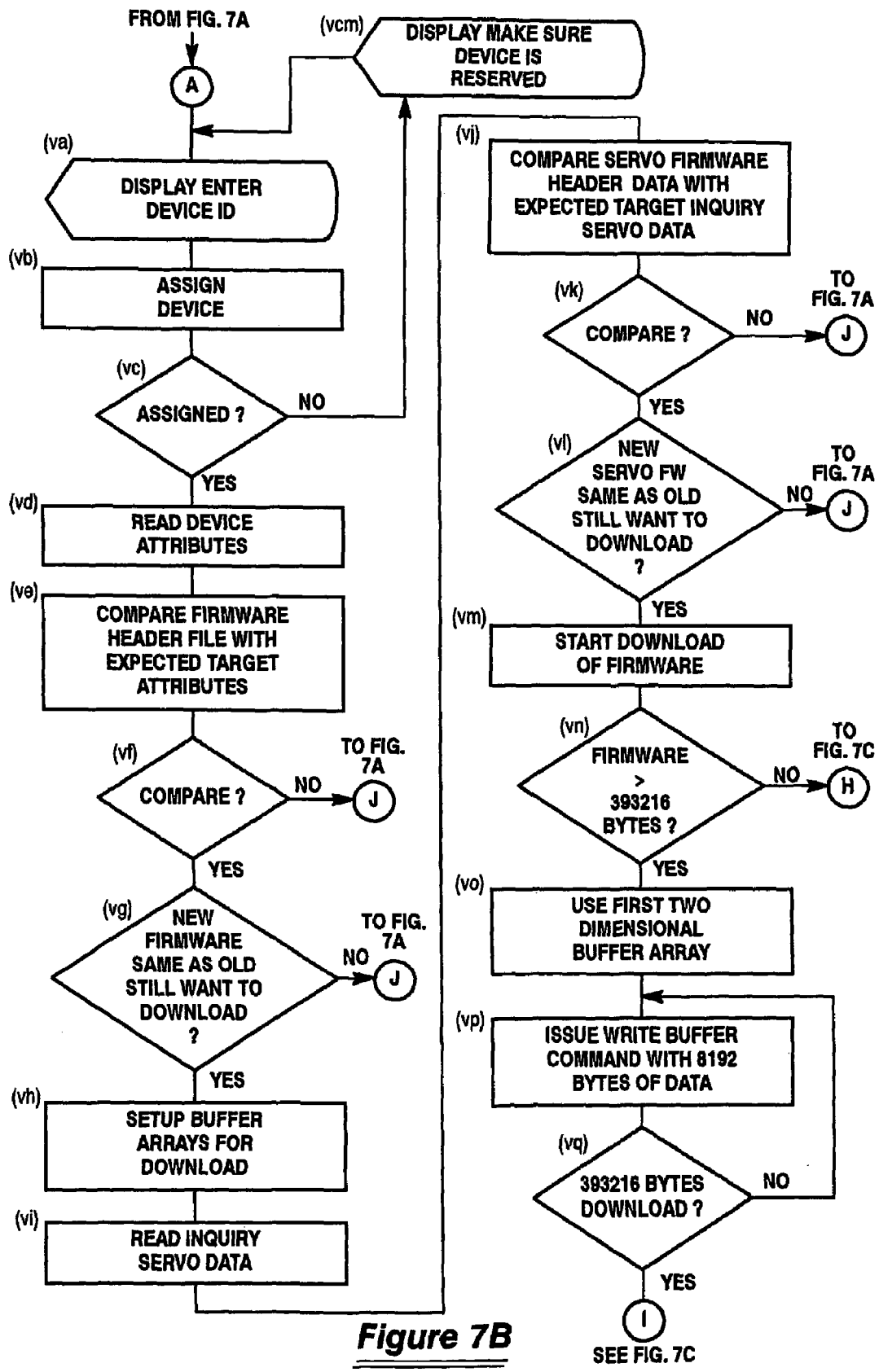
Figure 7C:
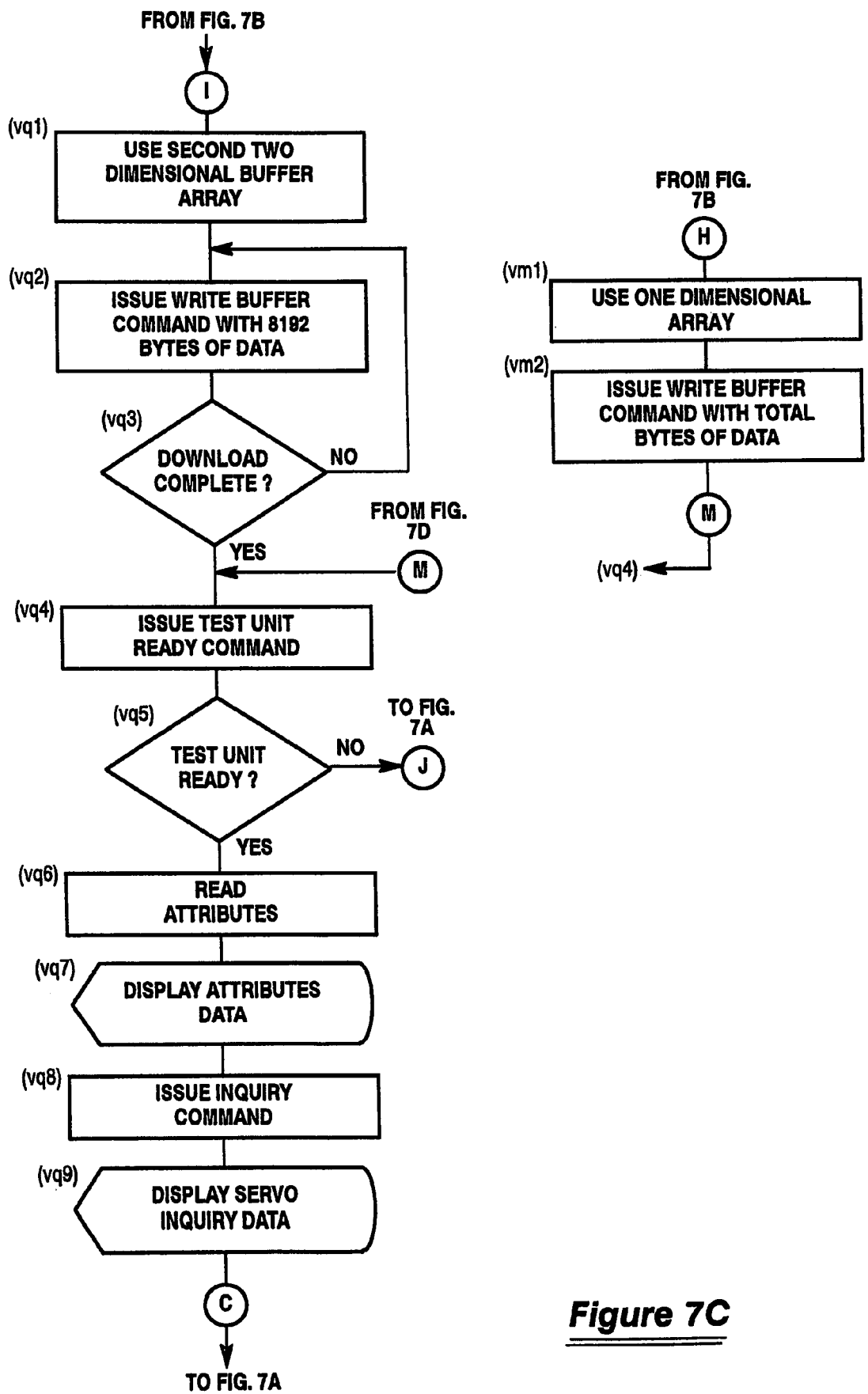
Figure 7D:
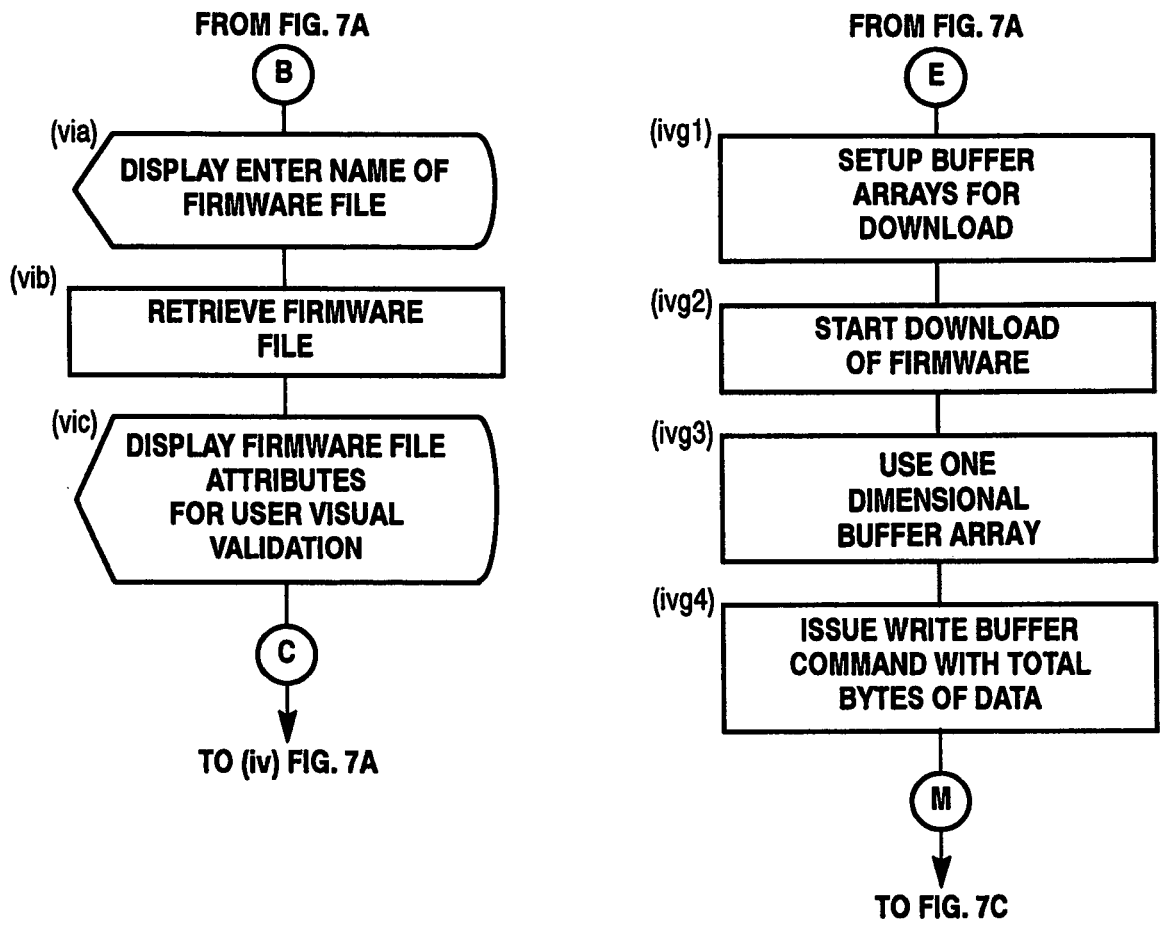

Now looking at the decision block at step (ivg), if at that point there is a need to download, (YES) then the procedure continues on via reference mark E, which is shown in FIG. 7D.

Now referring to FIG. 7D at step (ivg1), the system will set up the buffer arrays for enabling a download. Then at step (ivg2), the sequence will start to download of the firmware to the buffer array, such as was indicated in FIG. 6, which can utilize double sets of two-dimensional arrays.

In this particular case of FIG. 7D, the step (ivg3) will use a one dimensional buffer array. Then at step at (ivg4), the controller will issue the write buffer command showing the total bytes of data involved which then will continue at reference marker M over to FIG. 7C. The one-dimensional buffer array is selected for use when the firmware is less than 393,216 bytes of data which is the system max byte capacity. The two-dimensional buffer array is selected when the firmware is greater than the system max byte capacity of 393,216 bytes.

Thus from FIG. 7D to FIG. 7C, the reference marker M will continue on to step (vq4), where a Test Unit Ready Command is issued and then a step (vq5) query to check if the Test Unit is ready? If YES then step (vq6) will read the Inquiry Data (attributes) and display them at step (vq7) after which at step (vq8), an inquiry command is used. Then step (vq9) displays the servo inquiry data and continues via mark C to FIG. 7A. Here, steps (iv) through (viii) operate as previously described.

Now returning to FIG. 7A at the step (vi) which involves a decision block as to whether to verify only the firmware. If the answer here is YES, then the sequence proceeds via reference marker B over to FIG. 7D. Here the next step (via) is where there will be a display of entering the name of the firmware file. After this at step (vib), there will be a retrieval of the firmware file, after which at step (vic) there will be a display of the firmware file attributes for the user to provide visual validation. This then proceeds via reference marker C over to FIG. 7A at step (iv).

Now referring to FIG. 7B, it should be noticed that step (v) having the "YES" leg of FIG. 7A is now continued on FIG. 7B at the reference marker A. Here then there occurs step (va) where there is entered and displayed the device ID (identification). Then at step (vb), there is an assignment of the device which is the target device.

The next step (vc) is a decision block as to whether or not the target device has been assigned. If the answer is (NO), then at step (vcn) the sequence returns the step (va) in order that there be a certainty that the device is reserved through a display (vcn).

At step (vc), if the device has been assigned (YES), then the sequence proceeds to step (vd) in order to read the device Inquiry Data. Then at step (ve), a comparison is made between the firmware header file as against the target attributes which results in a decision block at step (vf) where the comparison, when it provides a "YES" result, will then go to step (vg) for another decision block to decide whether the new firmware is the same as the old firmware and whether there is a necessity to still download the new firmware. Here, if the answer is (YES), then at step (vh) the system will set up the buffer arrays for the downloading.

The next step is step (vI) which will read the inquiry servo data, after which at step (vj) there will be a comparison of the servo firmware header data with the expected target inquiry servo data. The servo firmware header revision level is compared with the expected target Inquiry Servo data to see if the system has already upgraded the firmware. If they compare, then the User is asked whether he still wants to reload the same level of servo firmware.

Then at step (vk), there is a comparison made, which if the answer is "YES" will then to proceed to step (vL) to enable a decision block to determine whether the new servo firmware is the same as the old and whether there is still a need to download. If there is a YES decision to further download, then the sequence proceeds to step (vm) which starts the download of firmware which then sequences to a new decision block at step (vn). This step queries whether the firmware is greater than 393,216 bytes. Here if the answer is "YES", then step (vo) the system will use the first two-dimensional buffer array. In FIG. 7B, step vo, and in FIG. 7C, step vq1, a test is made to see if the firmware is greater than 393,216 bytes, and if it is, the selection will be made to use the two dimensional buffer array.

Then at step (vp), the sequence will issue a write buffer command with 8,192 bytes of data. It is possible to control or select the size or length of each block being transferred within the limits of the hardware and software specifications. Even though a User could put up to 4,294,967,295 blocks/bytes of data, most systems have smaller buffer sizes that could not use all of the four bytes allocated for a typical 12 byte CDB. The Write Buffer command is a 10 byte CDB and only allocates 3 bytes for the parameter list length which is a maximum of 16,777,215 bytes/blocks. In the Unisys A-Series system, a total of 393,216 bytes of data would be the maximum that could be transferred in a Write Buffer command. When firmware data is greater than the system capacity of 393,216 bytes, the data is transferred in 8,192 byte blocks per Write Buffer command which complies with the Firmware Download Specification. Then at step (vq), a decision block is reached which will query whether there has been 393,216 bytes having been downloaded, which is the limit of the first two-dimensional buffer array.

Then at the reference marker I which pertains to FIG. 7C, (from FIG. 7B to FIG. 7C), the sequence then proceeds to step (vq1) where the sequence will use the second two-dimensional buffer array. Then the sequence proceeds to (vq2) where a write buffer command will be issued with 8,192 bytes of data. Then at step (vq3), a decision block queries whether the download is complete. If the answer is YES, then the sequence proceeds to step (vq4) which will then issue a TEST UNIT READY command. Then at step (vq5), a decision block will query whether the test unit is ready. If the answer is "YES," then the sequence proceeds to step (vq6) in order to read the attributes of the file. Then at step (vq7), there will be a display of the attribute data, after which at step (vq8) there will be an Inquiry Command issued which then proceeds to step (vq9) where there is a display of the Servo Inquiry Data. This then proceeds via reference marker C of FIG. 7A. This sequence then proceeds into step (iv) which was described previously.

It may be noted that steps (vf), (vg), (vk) and (vi) have a "NO" sequence which continues via mark J to FIG. 7A at step (viii), Terminate.

On step (vn) of FIG. 7B, the NO leg shows marker H to FIG. 7C where step (vn1) will select use of the one-dimensional array and then at step (vn2) will issue a Write Buffer Command specifying the total bytes of data to use. Then marker M continues to step (vq4), FIG. 7C, which continues on the previously described sequence (vq4) through (vq9) then (iv) through (viii).

Described herein is a system and method for more efficiently downloading firmware microcode to a target controller which manages a disk or tape unit. The system queries the target to find its attributes so that the proper firmware will be downloaded in an efficient manner. This involves selecting a single buffer array, two-dimensional buffer array or a double two-dimensional buffer array. Additionally, a check is made of the prior firmware to verify whether or not the newly to-be-loaded firmware is different from the prior firmware so as to eliminate any need for download if the prior and new firmware is found to be exact duplicates of each other.

While a preferred embodiment of the disclosed invention has been described, there may still be other implementations which involve the concept of the present invention which is defined in the attached claims.

What is claimed is:

1. A system for downloading firmware from a source module onto a controller of a storage medium with minimal latency of operation comprising:
   (a) first source software means providing SCSI firmware for a disk drive and servo SCSI firmware for positioning said disk drive;
   (b) a central processing unit having software programmable selection means for choosing single dimensional array means or dual two-dimensional array means for temporary storing said SCSI firmware prior to placement onto a target peripheral controller for said disk drive;
   (c) means for temporarily storing different versions of said firmware until said target controller has been accessed to identify the proper version of firmware required;
   (d) means for checking the pre-existing firmware in said target controller to determine whether an updated firmware version will be required for a subsequent download.

2. A system for downloading SCSI firmware and SCSI servo firmware in a rapid fashion onto a target control module, said system comprising:
   (a) a source software means for said SCSI firmware and SCSI servo firmware, said source software means including:
      (a1) control data received from tape, disk, CD-ROM or the World Wide Web;
   (b) central processing means for receiving said SCSI firmware and SCSI servo firmware from said source software means and utilizing a local memory means for separate storage areas for said SCSI firmware and for said servo SCSI firmware wherein said central processing means includes:
      (b1) software means for recognizing the number of bytes of said SCSI firmware and SCSI servo firmware to be downloaded;
      (b2) means for selecting a buffer array size which most closely accommodates said recognized number of bytes to be downloaded;
      (b3) software inquiry means to said target controller to acquire identification information;
      (b4) software means to determine, from said identification information, what version of said SCSI firmware and SCSI servo firmware will be downloaded to said target controller;
   (c) connection means from said local memory means over to a selected one of a plurality of disk drives for temporary storage;
   (d) peripheral controller means for loading said SCSI firmware into a first flash PROM and for loading said servo SCSI firmware into a second servo flash PROM;
   (e) means to Write said SCSI firmware from said first flash PROM and Write said SCSI servo firmware from said second flash PROM onto a targeted peripheral controller for a disk unit.

3. A system for downloading the appropriate SCSI firmware and SCSI servo firmware onto a target module controller and overcoming the normal capacity limitations of temporary buffer storage comprising:
   (a) software source means for providing SCSI firmware and SCSI servo firmware for a target controller;
   (b) processor means having means for providing first and second two-dimensional buffer array means for receiving and buffering said SCSI firmware and SCSI servo firmware destined for said target controller without adding any additional hardware;
   (c) software control means for transferring said SCSI firmware and servo firmware onto a targeted peripheral controller for a disk unit;
   (d) a library exported interface for issuing a download command request and an inquiry command to query the said target controller, said inquiry command including:
      (d1) means to check and compare the pre-existing firmware in said target controller to determine whether new updated firmware is required;
   (e) software means to access the appropriate firmware release numbers and servo release numbers to enable a selection of the appropriate SCSI firmware and SCSI servo firmware;
   (f) software selection means for selecting the appropriate number of array means of said first and second two-dimensional buffer array means to most efficiently store said selected firmware;
   (g) means for checking to indicate that said selected SCSI firmware and SCSI servo firmware has been downloaded to the proper target controller module.

4. A software method of selecting and downloading the appropriate SCSI firmware and servo firmware for a selected target control module comprising the steps of:
   (a) providing a plurality of storage media for holding different versions of SCSI firmware appropriate for different types of target control modules;
   (b) utilizing a DFAST utility program for initiating a firmware download to a target control module, said DFAST program functioning to download firmware to SCSI devices;
   (c) inquiring as to the identity and firmware requirements of a selected target control module said inquiring including the step of:
      (c1) checking the pre-existing firmware in said target controller to determine whether or not said pre-existing firmware requires any updating from the selected firmware on the selected storage media;
   (d) fetching, by said DFAST utility program, the appropriate firmware file from said storage media;
   (e) selecting a single or a double two-dimensional buffer array which accommodates the byte count of said appropriately selected firmware for temporary storage;
   (f) downloading the selected firmware by said DFAST utility program onto said target control module.

5. A system utilizing software means for rapid downloading, in one command cycle, of SCSI firmware and SCSI servo firmware into a target control module, comprising:
   (a) first software means for initiating a SCSI Inquiry Command to said target control module via a Command Descriptor Block;
   (b) second software means to query a designated target control module with information from a Page Code Field;
   (c) third software means for enabling access to and acquiring a firmware page number and a firmware version number for said target control module;
   (d) means for downloading said SCSI firmware and SCSI servo firmware using selected units of first and second two-dimensional buffer arrays;
   (e) means for passing said SCSI firmware onto said target control module;
   (f) means for sensing when said SCSI Inquiry Command initiates an illegal request.

* * * * *